United States Patent [19]

Argentati

[11] Patent Number: 5,754,120
[45] Date of Patent: May 19, 1998

[54] NETWORK CONGESTION MEASUREMENT METHOD AND APPARATUS

[75] Inventor: Merico Edward Argentati, Englewood, Colo.

[73] Assignee: Lucent Technologies, Murray Hill, N.J.

[21] Appl. No.: 576,411

[22] Filed: Dec. 21, 1995

[51] Int. Cl.$^6$ ........................................ H04Q 1/00
[52] U.S. Cl. ........................... 340/876; 340/825.8
[58] Field of Search ..................... 340/825.8, 826, 340/825.06, 825.17; 379/15, 273, 274; 370/388

[56] References Cited

U.S. PATENT DOCUMENTS

| | | | |
|---|---|---|---|
| 4,417,245 | 11/1983 | Melas et al. | 340/825.8 |
| 5,274,782 | 12/1993 | Chalasani et al. | 395/325 |
| 5,276,425 | 1/1994 | Swanson et al. | 340/826 |
| 5,291,477 | 3/1994 | Liew | 370/54 |
| 5,406,563 | 4/1995 | Loebig | 371/5.1 |
| 5,450,074 | 9/1995 | Yoshifuji | 340/825.8 |
| 5,451,936 | 9/1995 | Yang et al. | 340/826 |

OTHER PUBLICATIONS

AT&T Bell Labs, Engineering and Operations in the Bell System, 1982–1983, pp. 253–258.

The Bell System Technical Journal, A Study of Non–Blocking Switching Networks, Mar., 1953, pp. 406–424, by Charles Clos.

The Bell System Technical Journal, Reswitching of Connection Networks, May, 1962, pp. 833–855, by M.C. Paull.

IEEE Transactions on Computers, Nonblocking Broadcast Switching Networks, Sep., 1991, pp. 1005–1015, by Yuanyuan Yang.

*Primary Examiner*—Edwin C. Holloway, III

[57] ABSTRACT

A communication system including a CLOS switching network, and a method for characterizing network capacity, usage, congestion, and blocking and/or near blocking states. The CLOS switching network includes input, center and output stages each comprised of at least one switch, a plurality of first links connecting each input stage switch to each of the center stage switches, and a plurality of second links connecting each center stage switch to each of the output stage switches. The system also comprises a controller for determining the idle/busy status of each of the first and second links, and for calculating a measurement of available paths between each of the input stage switches to each of the output stage switches based on the status of the first and second links. In one embodiment of the method according to the present invention, the status of each link is determined and the measurement of available paths is checked prior to executing a routing algorithm to determine the path or paths that can be utilized to satisfy a communication request received by the system. Use of the system and method of the present invention permits for characterization of network capacity, usage, congestion, and blocking and/or near blocking states, and may also result in improved efficiency by avoiding complex routing calculations in no paths or only limited paths are available to satisfy the communication request.

26 Claims, 9 Drawing Sheets

THREE STAGE NETWORK
SPACE-SPACE-SPACE-MODEL

IDLE SYSTEM
CLOS NETWORK (n-3, m-5, r-3)

IDLE SYSTEM

INPUT CONN MATRIX: OUTPUT CONN MATRIX: B

| m/r | 1 | 2 | 3 | 1 | 2 | 3 |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| sum | 0 | 0 | 0 | 0 | 0 | 0 |

PATH MATRIX: C

| r/r | 1 | 2 | 3 |
|---|---|---|---|
| 1 | 0 | 0 | 0 |
| 2 | 0 | 0 | 0 |
| 3 | 0 | 0 | 0 |

PATH USAGE STATISTICS

| | | |
|---|---|---|
| 0 | 9 | 100.0 |
| 1 | 0 | 100.0 |
| 2 | 0 | 100.0 |
| 3 | 0 | 100.0 |
| 4 | 0 | 100.0 |
| 5 | 0 | 100.0 |

LIGHTLY LOADED SYSTEM
CLOS NETWORK (n-3, m-5, r-3)

LIGHTLY LOADED SYSTEM

INPUT CONN MATRIX: OUTPUT CONN MATRIX: B

| m/r | 1 | 2 | 3 | 1 | 2 | 3 |
|-----|---|---|---|---|---|---|
| 1 | 1 | 0 | 0 | 1 | 0 | 0 |
| 2 | 0 | 1 | 0 | 0 | 1 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| sum | 1 | 1 | 0 | 1 | 1 | 0 |

PATH MATRIX: C

| r/r | 1 | 2 | 3 |
|-----|---|---|---|
| 1 | 1 | 2 | 1 |
| 2 | 2 | 1 | 1 |
| 3 | 1 | 1 | 0 |

PATH USAGE STATISTICS
| | | |
|---|---|---|
| 0 | 1 | 11.1 |
| 1 | 6 | 77.8 |
| 2 | 2 | 100.0 |
| 3 | 0 | 100.0 |
| 4 | 0 | 100.0 |
| 5 | 0 | 100.0 |

NETWORK PATH USAGE DISTRIBUTION

HEAVILY LOADED SYSTEM
CLOS NETWORK (n-3, m-5, r-3)

HEAVILY LOADED SYSTEM

INPUT CONN MATRIX: OUTPUT CONN MATRIX: B

| m/r | 1 | 2 | 3 | 1 | 2 | 3 |
|---|---|---|---|---|---|---|
| 1 | 1 | 0 | 0 | 1 | 0 | 0 |
| 2 | 1 | 1 | 0 | 1 | 1 | 0 |
| 3 | 0 | 1 | 0 | 0 | 1 | 0 |
| 4 | 1 | 0 | 1 | 0 | 1 | 1 |
| 5 | 0 | 0 | 1 | 0 | 0 | 1 |
| sum | 3 | 2 | 2 | 2 | 3 | 2 |

PATH MATRIX: C

| r/r | 1 | 2 | 3 |
|---|---|---|---|
| 1 | 3 | 4 | 4 |
| 2 | 3 | 3 | 4 |
| 3 | 4 | 4 | 2 |

PATH USAGE STATISTICS

| | | |
|---|---|---|
| 0 | 0 | 0.0 |
| 1 | 0 | 0.0 |
| 2 | 1 | 11.1 |
| 3 | 3 | 44.4 |
| 4 | 5 | 100.0 |
| 5 | 0 | 100.0 |

NETWORK PATH USAGE DISTRIBUTION

SYSTEM WITH BLOCKING
CLOS NETWORK (n-3, m-5, r-3)

SYSTEM WITH BLOCKING

INPUT CONN MATRIX:    OUTPUT CONN MATRIX: B

| m/r | 1 | 2 | 3 | 1 | 2 | 3 |
|-----|---|---|---|---|---|---|
| 1   | 1 | 0 | 0 | 1 | 0 | 0 |
| 2   | 1 | 0 | 0 | 1 | 0 | 0 |
| 3   | 1 | 0 | 0 | 0 | 1 | 0 |
| 4   | 0 | 1 | 0 | 0 | 0 | 1 |
| 5   | 0 | 1 | 0 | 0 | 0 | 1 |
| sum | 3 | 2 | 0 | 2 | 1 | 2 |

X CANNOT BE CONNECTED TO Y

PATH MATRIX: C

| r/r | 1 | 2 | 3 |
|-----|---|---|---|
| 1   | 3 | 3 | 5 |
| 2   | 4 | 3 | 2 |
| 3   | 2 | 1 | 2 |

PATH USAGE STATISTICS

| 0 | 0 | 0.0   |
|---|---|-------|
| 1 | 1 | 11.1  |
| 2 | 3 | 44.4  |
| 3 | 3 | 77.8  |
| 4 | 1 | 88.9  |
| 5 | 1 | 100.0 |

NETWORK CONGESTION MEASUREMENT METHOD AND APPARATUS

FIELD OF THE INVENTION

The present invention relates to the field of CLOS, or three-stage cross-connect, switching networks, and in particular to a method and apparatus for characterizing network capacity, usage, congestion, and blocking and/or near blocking states.

BACKGROUND OF THE INVENTION

A cross-connect switch is a communications network device provided for establishing connection between a plurality of network nodes. A typical cross-connect switch is capable of providing a connection between any input line of the switch to any output line of the switch. Ideally, a cross-connect switch should be able to connect any input to any output without obstructing ("blocking") the connection status of any route, or path, between any other input line and any other output line. In other words, "non-blocking" means that there is always a path between any available input and any available output. A CLOS switching network is an example of a well-known non-blocking switch and is discussed, for example, in "A Study of Non-Blocking Switching Networks," C. Clos, *The Bell System Technical Journal*, March, 1953, pp. 406–432.

A CLOS switching network is architected in a multi-stage configuration so that fewer switching points are necessary to implement connections between its inputs and outputs than would be required by a single-stage switch architecture having the same input and output structure. A CLOS network consists of three stages—the input stage, the center or intermediate stage, and the output stage. For point-to-point connections, a CLOS network can guarantee non-blocking, i.e., a path will always be available, if:

$$m \geq n+g-1$$

where m is the number of center stage switches, n is the number of input lines to each of the input switches, and g is the number of output lines from each of the output switches. If n=g, then $m \geq 2n-1$. The above relationship is sometimes referred to as Clos's theorem. A CLOS network is used as a general term for three-stage networks that may or may not satisfy Clos's theorem.

While Clos's theorem ensures non-blocking in systems using exclusively point-to-point communications, the Clos theorem cannot guarantee non-blocking in systems using point-to-multipoint broadcasting. Today, communication networks must generally be able to handle point-to-point connections as well as broadcast communications as there is a growing demand for broadcast capability and for additional mappings and signal rates. Although it was conceivable that a CLOS network could be utilized for broadcasting, it was recognized that to preserve the non-blocking characteristic, the connection path configuration within the switch would have to be continually rearranged, or the number of middle stage switches could be increased. Such rearrangement was perceived to be prohibitive due to the time, effort, and resources required for rearrangement, and the provision of additional middle switches also adds additional cost to the switch.

More recently, routing algorithms have been developed and implemented to permit the CLOS network to handle both point-to-point and broadcast connections. A few examples of these algorithms are found in U.S. Pat. Nos. 5,450,074 and 5,276,425. These algorithms involve preferences for spanning to multiple point connections from the input stage, the center stage, or a combination of the input and center stages. The theory of the number of switches required to guarantee non-blocking in both point-to-point and broadcast connections is discussed in further detail in many technical papers, including "Reswitching of Connection Networks," Paull, M. D., *The Bell System Technical Journal*, Vol. 41, 1962, pp. 833–855; and "Nonblocking Broadcast Switching Networks," Yang, Y., *JSSE Transactions on Computers*, Vol. 40, No. 9, September 1991, pp. 1005–1015.

Non-blocking is important for many reasons, including the presence of a protected path or line. There are instances in which certain switch routes or paths in the network are to be preserved, and are known as a protected path. Protected paths are desirable to ensure that communication between a particular network input and a particular network output are always maintained, as may be necessary for priority or emergency communication, for example. The presence of one or more protected paths introduces complexity to the routing algorithms that is not easily or efficiently compensated for by current routing systems. Therefore, it is desired to provide a CLOS network capable of handling point-to-point and broadcast communications while efficiently recognizing and providing for the presence of one or more protected paths.

Due to the complexity of routing algorithms for broadcast-capable CLOS networks having at least one protected path, it is also desirable to ascertain the current availability of all lines of the network at any particular moment in time. This "snapshot" of network activity could be performed prior to execution of a time consuming and processor intensive algorithm to determine an available path or branch route for the requested communication. As a precursor to execution of the algorithm, precious time and resources are preserved in the event that no path or only one path is available, for example. Warnings could also be provided to indicate congestion of the network or near blocking of the network. Thus, the snapshot would be useful regardless of the routing algorithm utilized for the CLOS switching network.

Also, current status information reflecting network activity would be useful as an analysis tool. The performance of the network may be evaluated by viewing a snapshot of the network or by viewing or analyzing a series of such snapshots, for example. Further, the data provided could permit debugging of the system to unexpected near blocking situations or to audit the network state and possibly determine other anomalies, inefficiencies, or perhaps even shortcomings in the routing algorithm selected. The characterization may also be used as part of a connection simulator to characterize the distribution of usage of the switching capacity of the network. Therefore, it is desired to provide a CLOS switching network and a method for routing communications that includes the capability to ascertain the activity of the network at any point in time.

SUMMARY OF INVENTION

The present invention provides a communication system and method for CLOS switching networks that permit for characterization of network capacity, usage, congestion, and blocking and/or near blocking states.

In one embodiment, the system includes a CLOS switching network and a controller. The CLOS switching network includes input, center and output stages, with each stage having at least one switch. The network also includes a plurality of first links connecting each of the at least one switches of the input stage to each of the at least one switches of the center stage. The network further includes a plurality of second links connecting each of the at least one center stage switches to each of the at least one output stage switches.

The controller includes a means for determining a status for each of the first and second links, with the status indicative of whether that link is currently idle (unused) or busy (used) in satisfying a communication request. The controller also includes a means for calculating a number of available paths between each of the at least one input stage switches to each of the at least one output stage switches from the status of the first and second links. A path is defined as the combination of a first link and a second link through a common center stage switch which may be used to connect the respective input stage switch to the respective output stage switch. The path availability calculation is based on the ascertained status of the first and second links. Specifically, a path is available if both a first and a second link connecting an input stage switch to an output stage switch through the same center stage switch are idle.

According to the method of the present invention, the states of the links are determined and the number of available paths are determined by the controller of the system. The path availability data is a reflection of the network usage, and can also be used to indicate blocking and/or non-blocking states, thereby giving the user path assurance information. The data also is indicative of network capacity and congestion.

By using the method of the present invention prior to determining a path or paths for satisfaction of a communication request, system efficiencies result. No routing calculations are necessary if no paths, only one path, or not enough paths are available to satisfy the request. By examining the path availability information, inefficiencies in routing algorithms can be determined, a simulator to characterize distribution of network usage can be developed, and new routing algorithms can be tested or debugged. The system and method of the present invention are not dependent upon the routing algorithm of the system, and can be integrated into existing system, or the routing algorithm can be modified to recognize unavailable paths and eliminate the unavailable paths from consideration. Further, protected paths are easily accommodated and remain protected as desired. Finally, the system and method may be used to process point-to-point and/or broadcasting communications, and may be used with symmetrical and nonsymmetrical CLOS switching networks as the invention is independent of whether the CLOS network satisfies Clos's theorem.

The above discussed features, as well as additional features and advantages of the present invention, will become more readily apparent by reference to the following detailed description and the accompanying drawings.

DETAILED DESCRIPTION OF THE DRAWINGS

Figure 1:
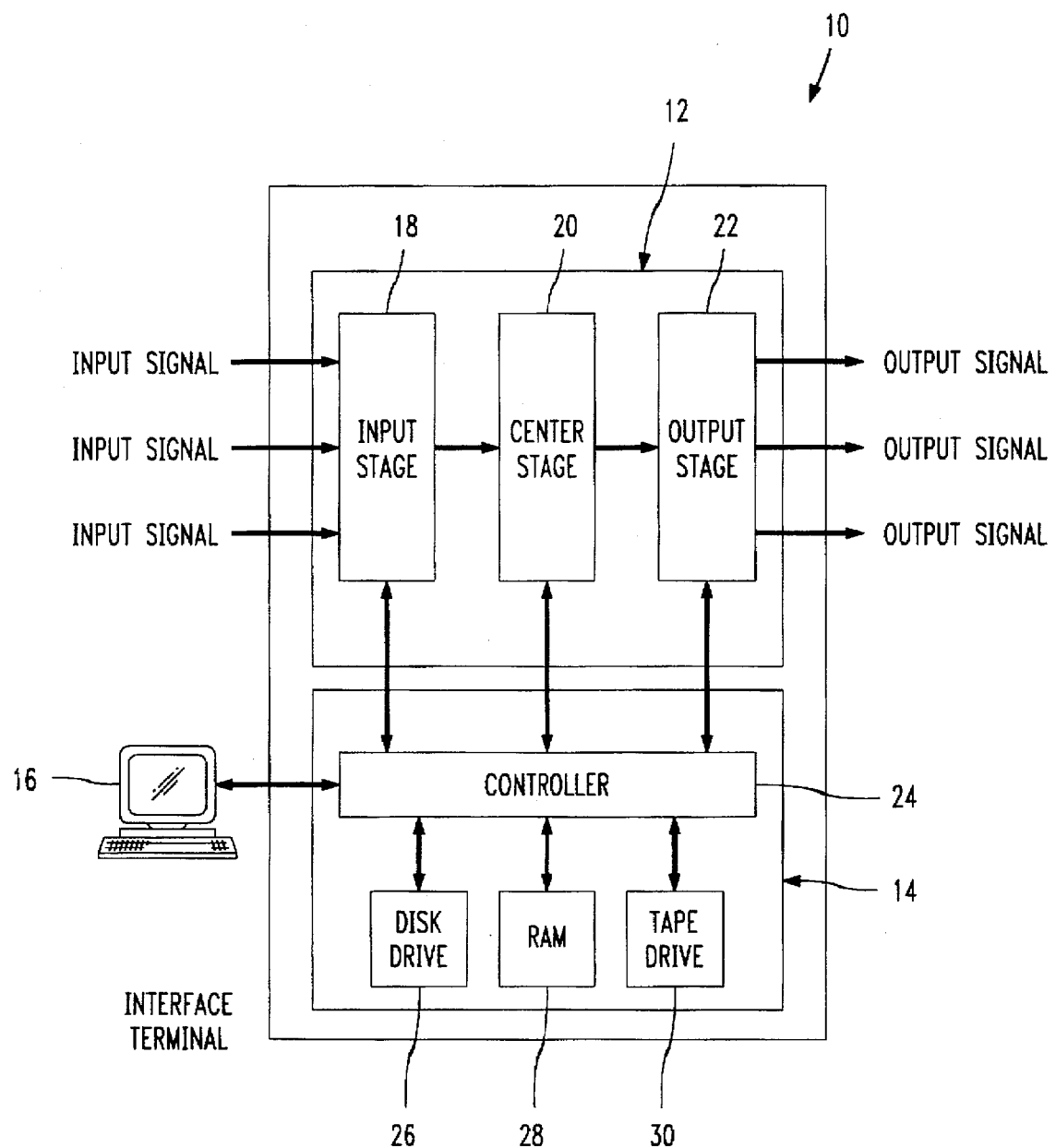
FIG. 1 illustrates a simplified schematic view of the switching system of the present invention including a CLOS network and an associated controller.

FIG. 1 illustrates a simplified schematic view of the switching system of the present invention including a CLOS network and an associated controller. Specifically, the communication system 10 includes a CLOS switching network 12, a control subsystem 14, and an interface terminal 16. The CLOS switching network 12 includes an input stage 18 having a plurality of input ports connected thereto for receipt of a plurality of input signals, a center stage 20, and an output stage 22 having a plurality of output ports connected thereto for transmission of a plurality of output signals. The connection of the input, center, and output stages 18, 20 and 22 to each other and to the input and output signals is explained in further detail herein in association with FIG. 2.

In this embodiment, the control subsystem 14 includes controller 24 having input and output ports for communication with and control of the switches of the input, center, and output stages 18, 20 and 22 of the CLOS switching network 12. The controller 24 may comprise a microprocessor or a computer as is well known in the art. Executing on the controller 24 is an algorithm for routing requested communication between the various system inputs and outputs, as is well known in the art. The routing or path selection algorithm may support point-to-point connections, broadcasting, or both, and may also support protected paths (i.e., paths preserved for special use and unavailable for fulfillment of general communication requests).

Also shown in FIG. 1 as comprising a part of the control subsystem are a disk drive 26, a RAM (random access memory) device 28, and a tape drive 30. The disk drive 26 and the tape drive 30 are illustrative of long-term, non-volatile storage devices connected to the controller 24 for retention of data collected by the controller 24 or for provision of information to the controller 24. Further, the operating system, the system software, and/or the routing algorithm may be stored on the disk drive 26 or the tape drive 30. Other non-volatile storage devices, such as EEPROM or an optical disk, as is well-known in the art, may be used for these purposes.

The RAM 28 of the control subsystem 14 is illustrative of a high-speed storage device, and is connected to the controller 24 for storage and retrieval by the controller 24 of temporary information. Such temporary information stored in the RAM 28 may comprise, for example, data created and/or utilized by the routing algorithm executing on the controller 24. The stored information includes, but is not limited to, one or more status tables indicating whether a particular input or output line to the switches of the input, center, and output stages 18, 20 and 22 is currently being used. Such status information is generally provided in some form for all routing algorithms to avoid the use of an already engaged or busy line. The RAM 28 may comprise other high-speed storage media as is well known in the art. Further, the RAM 28 may be integrated with the controller 24 rather than provided independently as illustrated in FIG. 1.

In this embodiment, the system 10 also includes an interface terminal 16. The interface terminal 16 may be used by an operator for a myriad of purposes, including instructing the controller 24 of desired configuration changes for the CLOS network 12, specifying particular communications to be made, and displaying and/or manipulating data accessible to the interface terminal 16 through its connection with the controller 24. In this embodiment, unlimited broadcast can be accommodated within any given single switch in any of the input, center, and output stages 18, 20 and 22.

With the exception of the present invention described in further detail herein, the communication system 10 could comprise a communication system well-known in the art. The controller 24 may comprise AT&T Corp.'s Model DACS VI-2000 Main Controller, for example, having modifications thereto as explained herein.

Figure 2:
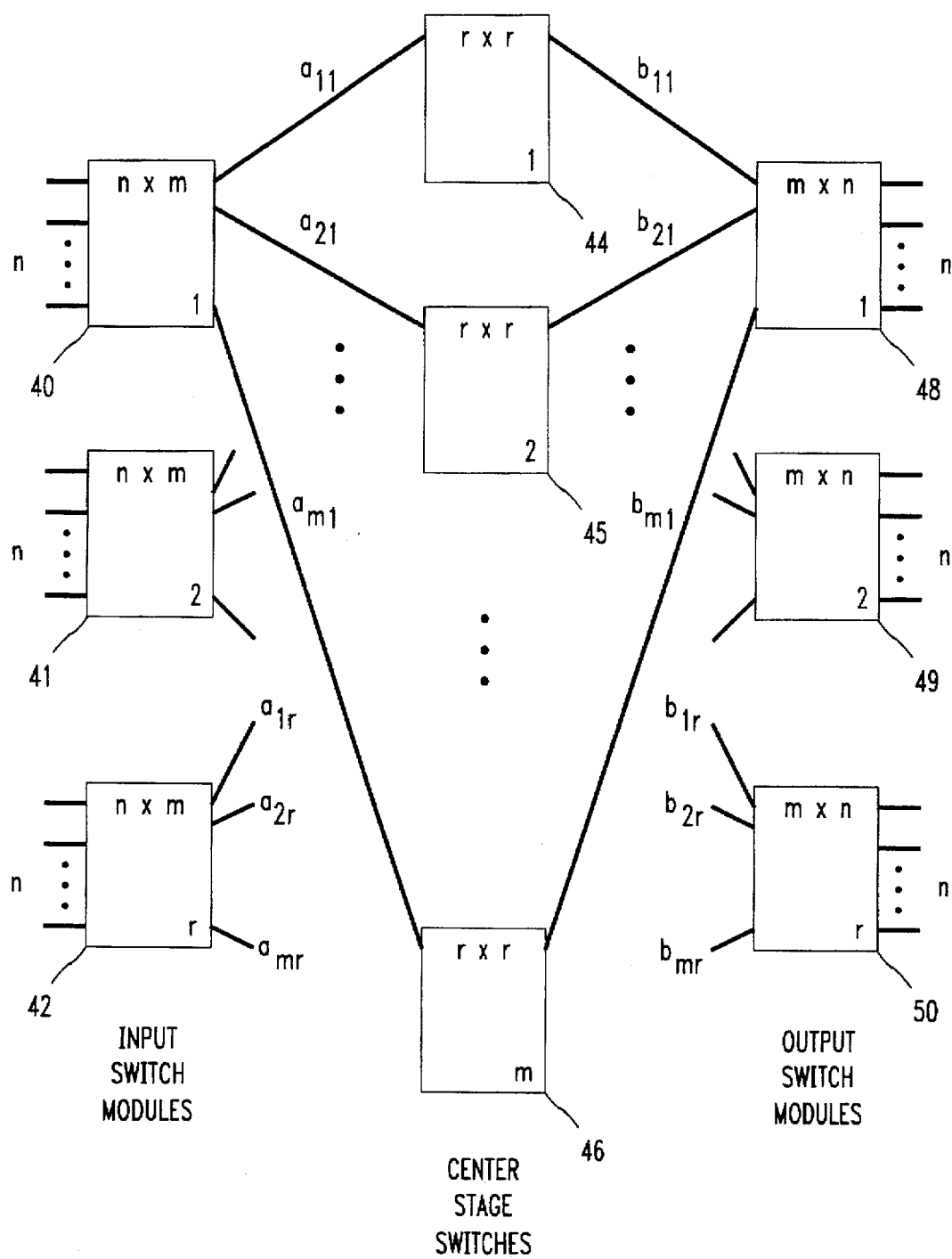
FIG. 2 illustrates a simplified schematic view of a CLOS switching network according to the prior art.

Referring now to FIG. 2, there is illustrated a simplified schematic view of a CLOS switching network according to the prior art. In this embodiment, the CLOS switching network is a space-space-space model. Use of the space-space-space model is useful for illustrative and discussion purposes. However, other switching network models, such as time-space-time are equivalent and within the scope of the present invention. Returning to FIG. 2, the input stage 18 comprises 1 through r input switch modules 40 ... 42, with each input switch module 40 ... 42 having n inputs for receipt of input signals to the CLOS switching system 12. Each input switch module 40 ... 42 also comprises m outputs for connection to the center stage 20. The center stage 20 includes 1 through m center stage switches 44 ... 46. Each center stage switch 44 ... 46 includes r inputs and r outputs so that each center stage switch 44 ... 46 is connected to each of the input switch modules 40 ... 42. The output stage 22 comprises 1 through r output switch modules 48 ... 50, and each output switch module 48 ... 50 includes m inputs so that each output stage module 48 ... 50 is connected to each of the center stage switches 44 ... 46. Each output switch module 48 ... 50 also includes n outputs providing output signals from the CLOS switching network 12.

The connections or links of the input switch modules 40 ... 42 to the center stage switches 44 ... 46 are designated as $a_{ij}$, where $1 \leq i \leq m$ and $1 \leq j \leq r$. Similarly, the links of the center stage switches 44 ... 46 to the output switch modules 48 ... 50 are designated as $b_{ij}$.

The CLOS switching network of FIG. 2 is symmetrical as the number of input switch modules 40 ... 42 equals the number of output switch modules 48 ... 50, and also because each input switch module 40 ... 42 has n inputs and each output switch module 48 ... 50 has n outputs. The present invention does not require the use of a symmetrical CLOS switching network. The number of inputs to each input stage module 40 ... 42 may differ from the number of outputs from each output stage module 48 ... 50. The number of input stage switches may also differ from the number of output stage switches.

According to the present invention, status information is collected by the controller 24, temporarily stored in the RAM 28, and manipulated to characterize network capacity usage, congestion, and blocking and/or near blocking network states for the CLOS switching network 12, or any three-stage cross-connect switching network. Specifically, from the RAM 28, or directly from the network 12, the busy/idle status of all links $a_{ij}$ and $b_{ij}$ is collected by the controller 24 and inserted into two matrices—the Input Connection Matrix, and the Output Connection Matrix—from which is created the Path Matrix to indicate a measurement of the availability of a route or path for the next or current requested communication.

The Input Connection Matrix (ICM) maps the idle/busy status of the first links $a_{ij}$ between the input switch modules 40 ... 42 and the center stage switches 44 ... 46. Specifically, each element of the array is zero (0) if the link is idle, or one (1) if the link is in use.

| Input Connection Matrix: A | | | | | |
|---|---|---|---|---|---|
| m/r | 1 | 2 | 3 | ... | r |
| 1 | $a_{11}$ | $a_{12}$ | $a_{13}$ | ... | $a_{1r}$ |
| 2 | $a_{21}$ | $a_{22}$ | $a_{23}$ | ... | $a_{2r}$ |
| 3 | $a_{31}$ | $a_{32}$ | $a_{33}$ | ... | $a_{3r}$ |
| ... | ... | ... | ... | ... | ... |
| m | $a_{m1}$ | $a_{m2}$ | $a_{m3}$ | ... | $a_{mr}$ |

Similarly, the Output Connection Matrix (OCM) defines the idle/busy status of the second links $b_{ij}$ between the center stage switches 44 ... 46 and the output switch modules 48 ... 50.

| Output Connection Matrix: B | | | | | |
|---|---|---|---|---|---|
| m/r | 1 | 2 | 3 | ... | r |
| 1 | $b_{11}$ | $b_{12}$ | $b_{13}$ | ... | $b_{1r}$ |
| 2 | $b_{21}$ | $b_{22}$ | $b_{23}$ | ... | $b_{2r}$ |
| 3 | $b_{31}$ | $b_{32}$ | $b_{33}$ | ... | $b_{3r}$ |
| ... | ... | ... | ... | ... | ... |
| m | $b_{m1}$ | $b_{m2}$ | $b_{m3}$ | ... | $b_{mr}$ |

The Path Matrix (PM) is determined by the controller 24 and is defined as follows:

$$C = A^{T*} \otimes^T B$$

where $c_{ij} = \Sigma_{k=1}^{m}(a_{ki} \text{ OR } b_{kj})$, and $0 \leq c_{ij} \leq m$. As is explained in greater detail herein, the PM reflects the activity of the first and second links $a_{ij}$ and $b_{ij}$ of the CLOS switching network 12; and therefore, indicates the availability of such links for future requests.

| Path Matrix: C | | | | | |
|---|---|---|---|---|---|
| r/r | 1 | 2 | 3 | ... | r |
| 1 | $c_{11}$ | $c_{12}$ | $c_{13}$ | ... | $c_{1r}$ |
| 2 | $c_{21}$ | $c_{22}$ | $c_{23}$ | ... | $c_{2r}$ |
| 3 | $c_{31}$ | $c_{32}$ | $c_{33}$ | ... | $c_{3r}$ |

-continued

| Path Matrix: C | | | | | |
|---|---|---|---|---|---|
| r/r | 1 | 2 | 3 | ... | r |
| ... | ... | ... | ... | ... | ... |
| m | $c_{m1}$ | $c_{m2}$ | $c_{m3}$ | ... | $c_{mr}$ |

During calculation of PM, instead of standard multiplication, the columns of the ICM and the OCM are ORed together, and then the result is arithmetically added. The "⊗" symbol is used for this operation in the above equation. Each path element, $c_{i,j}$, indicates the number of busy point-to-point paths between the $i^{th}$ input switch module and the $j^{th}$ output switch module. Thus, m−$c_{ij}$ is the number of available paths between the $i^{th}$ input switch module and the $j^{th}$ output switch module, i.e., the number of paths in which a first link and a second link connecting the $i^{th}$ input switch module and the $j^{th}$ output switch module are both idle. $c_{ij}$ also indicates the number of busy center stage switches that are not available for new requests for connections between the $i^{th}$ input switch module and the $j^{th}$ output switch module.

The maximum number of busy point-to-point paths over all I/O switch module pairs is m. Thus, if $c_{ij}$ is less than m, the next single point-to-point connection request can be satisfied. However, if $c_{ij}$=m, no connection between the $i^{th}$ input switch module and the $j^{th}$ output switch module is available for any request. A broadcast can be accomplished from the $i^{th}$ input switch module to all output switch modules with corresponding elements in row i of the PM that are less than m.

The PM can be recalculated at any time, or, if properly initialized, the PM may be updated incrementally as each connection is established. Incremental updating permits for the values of the array PM elements to be available for immediate evaluation. To incrementally update the PM, all elements $c_{ij}$ should be set to zero when the communication system is initialized. Then, as a connection is made from input switch module i to output switch module j, only the elements of the PM in row i or column j need to be changed by either 0 or +1. Assuming center switch k is chosen for the path, then $c_{ij}=c_{ij}+1$ $c_{ij}=c_{il}+1-b_{kl}$, where l=1 to r, l≠j $c_{ij}=c_{lj}+1-a_{kl}$, where l=1 to r, l≠i Similar formulas apply to disconnects (decrementing appropriate elements of the PM) and/or broadcasts (incrementing multiple elements), and basically involve the elements of the ICM or the OCM that are changed because of the center stage switch that is chosen. The incremental approach yields considerable efficiency when compared to the calculation of the entire PM each time a point-to-point connection, a broadcast, or a disconnection request is satsified.

Whether the PM is calculated by ORing together the ICM and the OCM as discussed herein, or calculated incrementally as discussed immediately above, it will be appreciated that the PM may accommodate protected lines or paths. Specifically, if L protected paths are to be reserved between input switch module u and output switch module v, then the element $c_{uv}$ of the PM should be compared to the value m−L for a communication request that does not constitute a request that comprises the protected path(s)' purpose. The value m−L represents the maximum number of paths available without violating the desire to reserve L protected paths.

The use of matrix PM as an indication of network usage capacity, congestion, and blocking and/or near blocking network states is illustrated herein in association with FIGS. 3–6. FIGS. 3–6 show a sample CLOS switching network 52 in idle, lightly loaded, heavily loaded, and blocking states, respectively. The sample CLOS switching network 52 comprises: three input switch modules 53, 54 and 55, each having three inputs and five outputs; five center stage switches 56 . . . 60, each having three inputs and three outputs; and three output switch modules 61, 62 and 63, each having five inputs and three outputs. Thus, m=5, r=3, and n=3, in this embodiment.

Figure 3:
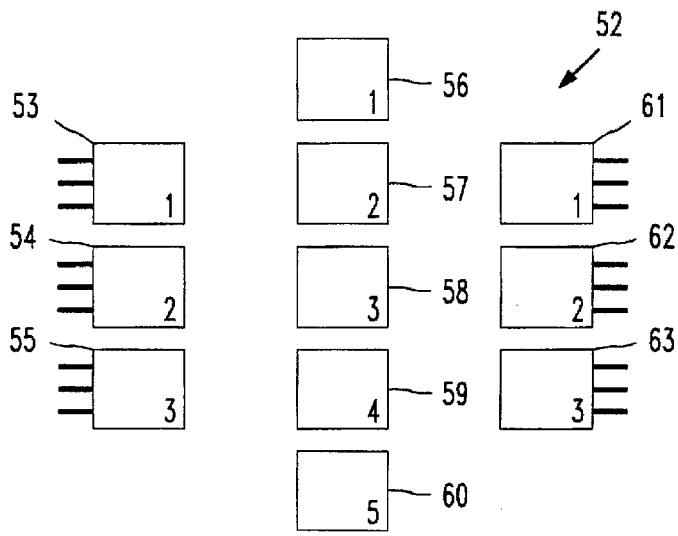
FIG. 3 illustrates a schematic view of an idle CLOS network, together with the input, output, and path matrices, path usage statistics and a graph of the path usage statistics, for the idle network in accordance with the present invention.
Figure 3:
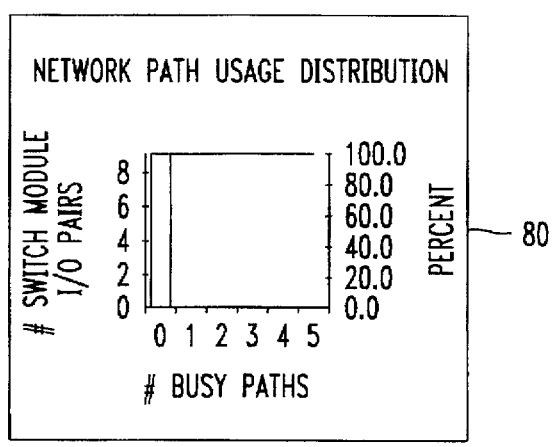

When the sample CLOS switching network 52 is idle, as shown in FIG. 3, all links $a_{ij}$ and $b_{ij}$ are idle, so that all elements of the ICM 64 and the OCM 65 are zero (0) as shown. Hence, all elements $c_{ij}$ of the PM 66 are also zero (0). Because m=5, this means that five (5) paths (m−$c_{ij}$ paths) are available between each $i^{th}$ input switch module and $j^{th}$ output switch module combination of the sample CLOS switching network 52.

Figure 4:
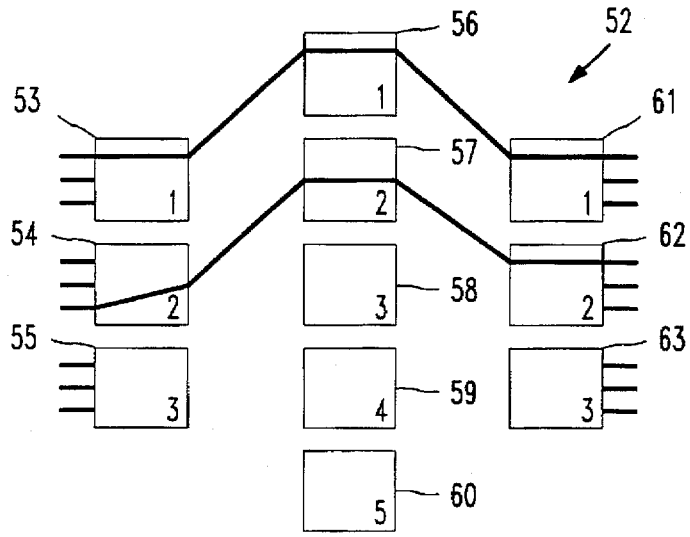
FIG. 4 illustrates a schematic view of a lightly loaded CLOS network, together with the input, output, and path matrices, path usage statistics and a graph of path usage statistics, for the lightly loaded CLOS network in accordance with the present invention.
Figure 4:
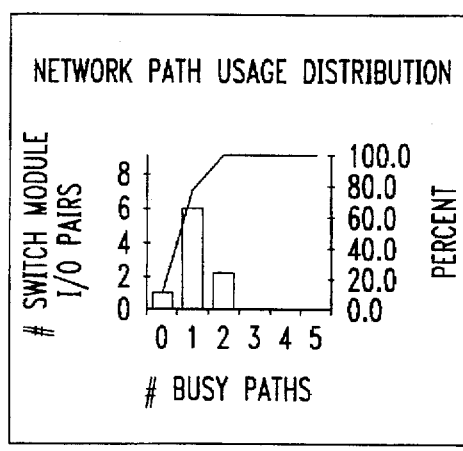

In FIG. 4, the sample CLOS switching network 52 is lightly loaded. Specifically, links $a_{11}$, $a_{22}$, $b_{11}$, and $b_{22}$ are currently busy as indicated by the appropriate matrix elements of the ICM 67 and the OCM 68. Thus, network 52 has processed communication requests to link the first input of the first input stage switch 53 with the first output of the first output stage switch 61, and to link the third input of the second input stage switch 54 with the first output of the second output stage switch 62. In prior art systems and in the present invention, the controller 24 receives such communications requests.

The values of the PM 69 for network 52 of FIG. 4 indicate that no less than three (3) paths are available between any of the $i^{th}$ input switch modules and the $j^{th}$ output switch module, as no element of the PM 69 is greater than two (2). For example, $c_{12}$=2, implying that three (3) paths between the first input switch module 53 and the second output switch module 62 are still available for use. This can be verified by examination of the schematic diagram of the sample CLOS switching network of FIG. 4. $a_{11}$ is busy, leaving the possibility of going through $a_{12}$, $a_{13}$, $a_{14}$ and $a_{15}$ to get to the second output switch module 62. However, $a_{12}$ is not a viable path as the link $b_{22}$ between the second center stage switch 57 and the second output switch module 62 is already busy.

Figure 5:
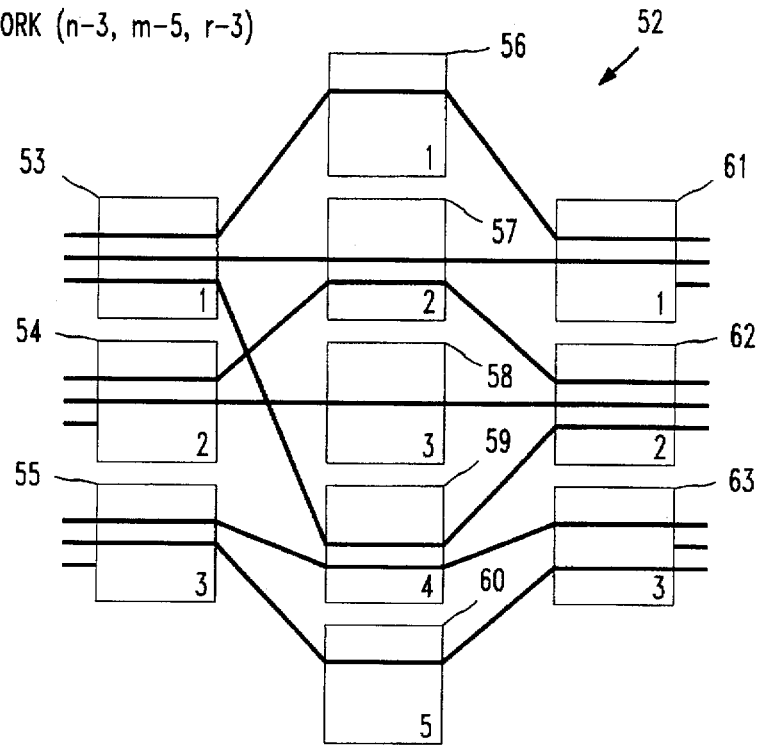
FIG. 5 illustrates a schematic view of a heavily loaded CLOS network, together with the input, output, and path matrices, path usage statistics and a graph of path usage statistics, for the heavily loaded CLOS network in accordance with the present invention.
Figure 5:
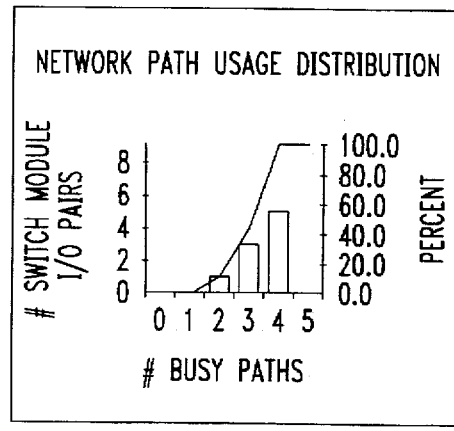

In the embodiment of FIG. 5, the sample CLOS network 52 is heavily loaded as indicated in this simple example by examination of the ICM 70 and the OCM 71, but no path is unavailable. Because many of the elements of the PM 72 are four (4), however, the PM 72 does inform the system that blocking may occur after processing of the next request. Thus, a near-blocking state exists where the element of the PM 72 is four (4). The relative uniformity of the values in the PM 72 also indicate that the network 52 has uniformly handled the requests that it has thus far honored.

Figure 6:
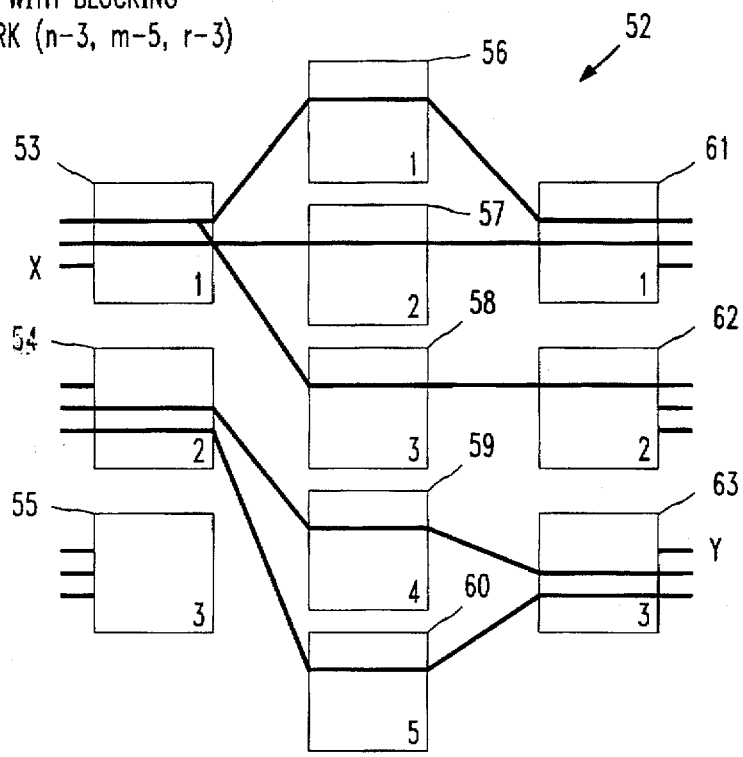
FIG. 6 illustrates a schematic view of a CLOS network with blocking, together with the input, output, and path matrices, path usage statistics and a graph of the path usage statistics, for the blocked network in accordance with the present invention.
Figure 6:
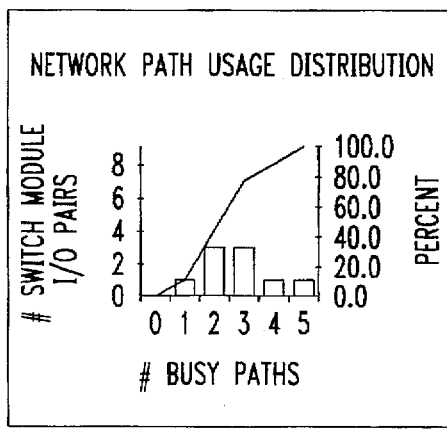

In FIG. 6, blocking has now occurred. Specifically, although not evident by examining the ICM 73 and the OCM 74, it is not possible to process another request between the first input switch module 53 and the third output switch module 63 as the value of $c_{13}$=5=m. Using the drawing of network 52 to verify this blocking, note that only the links $a_{41}$ and $a_{51}$ from the first input switch module 53 are available outputs from the first input switch module 53. However, the links $b_{43}$ and $b_{53}$ are already busy, so no path exists between the first input switch module 53 and the third output switch module 63. At least one path does exist, for all other input/output switch module pairs represented by the PM 75. Not only does the value of $c_{13}$=5 effectively prevent point-to-point connection between the first input switch module 53 and the third output switch module 63, but it is not possible to broadcast a message from the first input switch module 53 to all three output switch modules 61 ... 63. Such a one-to-three broadcast message through either the second or the third input switch modules 54 or 55, respectively, is possible, however, as is indicated by the PM 75 as all elements of row 2 and row 3 of the PM 75 are less than m.

In addition to the path availability matrix PM, also illustrated in FIGS. 3–6 are tables of path usage 76, 77, 78, and 79, together with a graph of path usage 80, 81, 82 and 83, respectively. The path usage statistics, $s_k$, for each value of k from 0 to m is the number of I/O pairs ($i^{th}$ input switch module and $j^{th}$ output switch module pairs) having k busy point-to-point paths. For example, $s_o$ is the sum of the number of elements in the PM that are equal to zero. Thus, this statistic reflects the uniformity, or lack thereof, of the activity of the network. By graphing $s_k$ vs. k, the path usage tables 76 ... 79, as seen in the path usage graphs 80 ... 83 in FIGS. 3–6, respectively, a visual indication of network activity is provided to the viewer. Such information may be displayed on interface terminal 16 (see FIG. 1), or on a printer or other visual display device.

Figure 7:
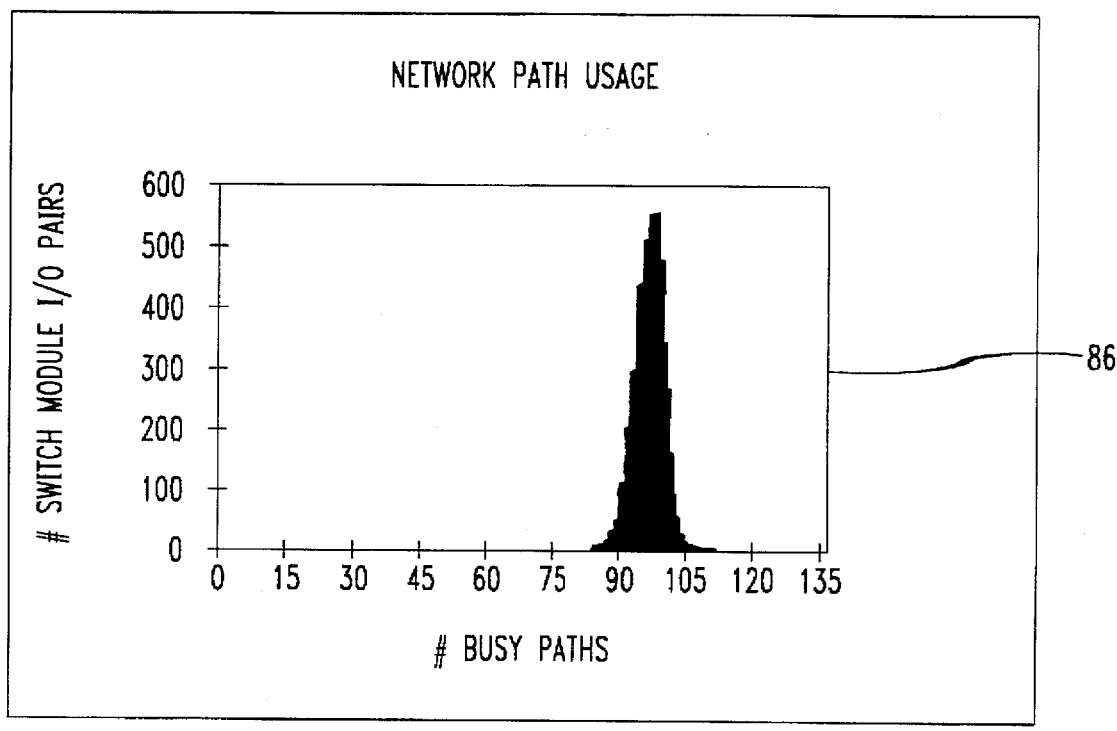
FIG. 7 illustrates a graph of path usage statistics for a CLOS network having one-hundred thirty-five center stage switches.

Referring now to FIG. 7, there is shown a graph of path usage statistics for a larger CLOS switching network than is shown in graphs 80 ... 83 of FIGS. 3–6. Specifically, $s_k$ is shown as graph 86 for a CLOS switching network having sixty-four (64) input stage switches and sixty-four (64) output stage switches, with each input stage switch having sixty-three (63) inputs and each output stage switch having sixty-three (63) outputs. The CLOS switching network of FIG. 7 also has one hundred thirty-five (135) center stage switches. Thus, r=64, n=63, and m=135. The path usage graph 86 indicates that the network is being utilized, but, because the number of busy paths for each I/O pair is less than m (135), several paths are yet available through the network for each I/O pair.

Returning now to FIG. 1, the communication system of the present invention comprises the CLOS switching network 12, and the control subsystem 14. The controller 24 not only controls the switches of the input, center and output stages 18, 20 and 22, the controller 24 also serves as a means for selecting one or more communication paths through the CLOS switching network 12 based upon communication requests, such as point-to-point communication or broadcasts, received by the controller 24. Communication requests provide an indication of selected input and output stage switches through which one or more signals are to be transmitted (connection request) or through which transmission is to cease (disconnection request). According to the present invention, which input port to the selected input stage switch and which output port from the selected output stage switch are to be used are not relevant to these calculations. Communication requests are sent to the controller 24 from the interface terminal 16 or from another network control device (not shown) as may be used to control a plurality of communication systems such as the exemplary communication system of FIG. 1, for example.

The means for selecting communication paths, i.e., the controller 24, may comprise a known method for path selection together with the path availability capability discussed herein above. Alternatively, the controller 24 may execute a modified path selection means—the modification being the integration of the path availability capability discussed herein.

Figure 8:
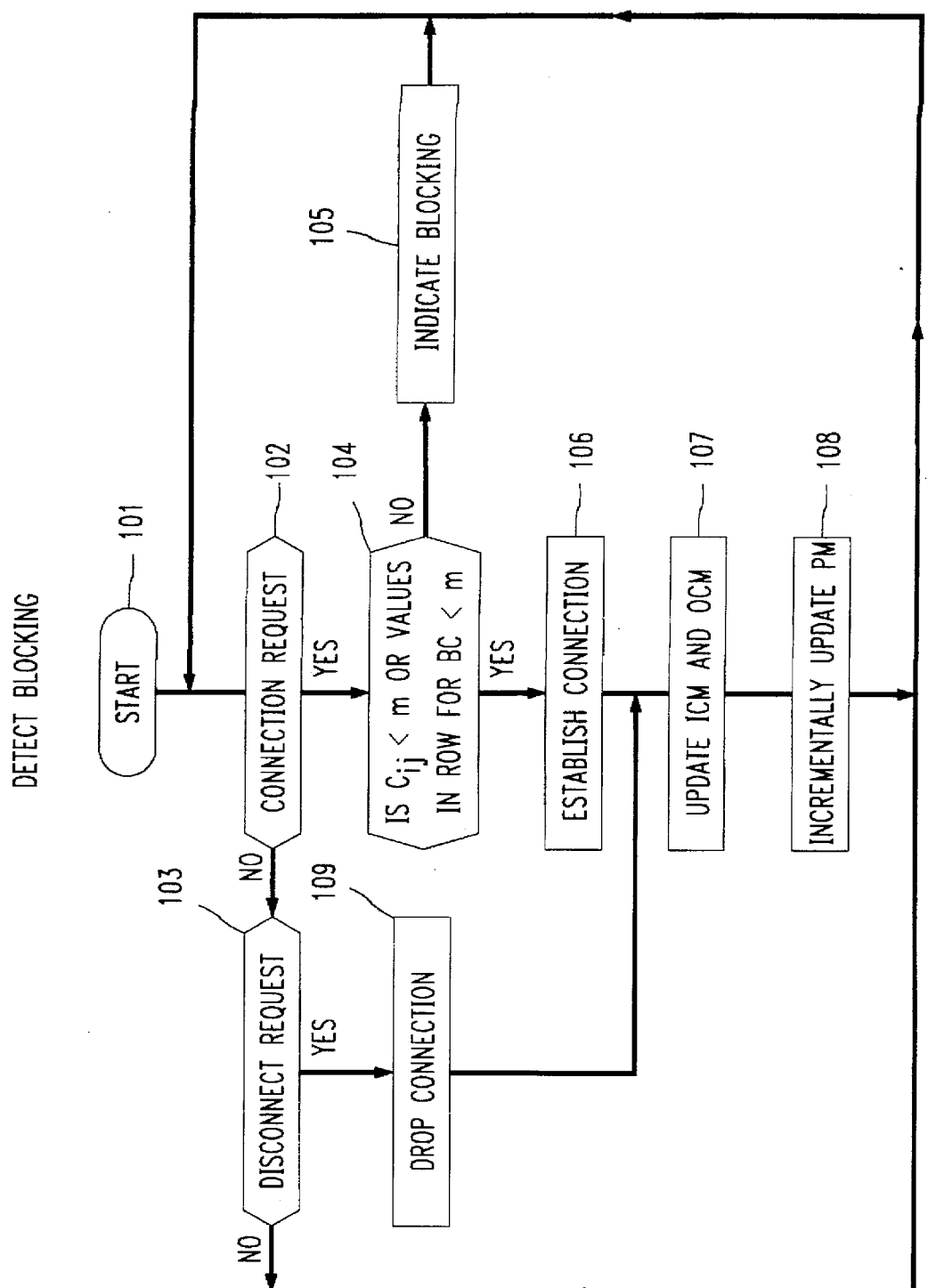
FIG. 8 illustrates a flow chart of an exemplary process for selecting paths of communication based upon communication requests according to the present invention.
Figure 9:
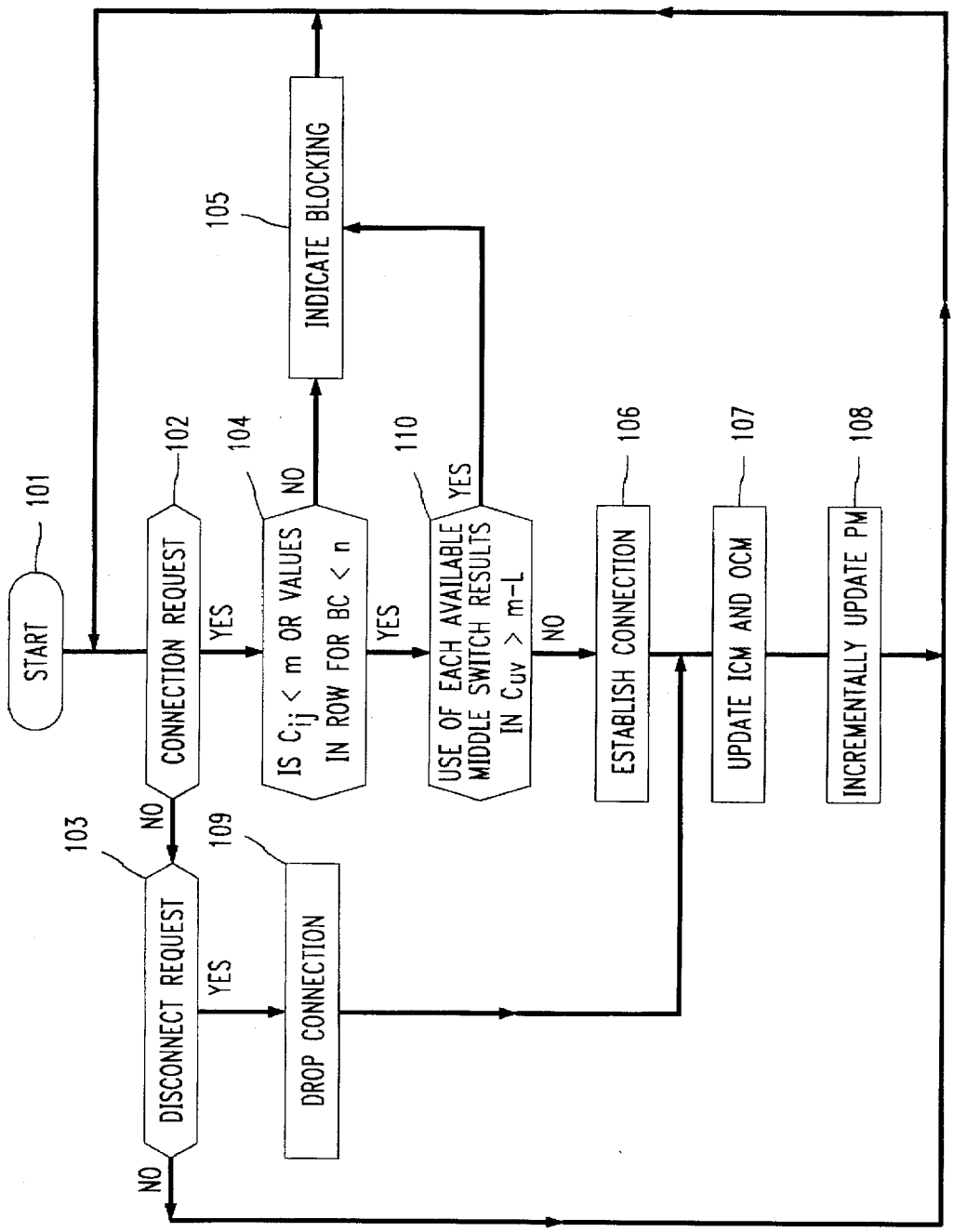
FIG. 9 illustrates a flow chart of a second exemplary process according to the present invention in which one or more protected paths are reserved.

Considering the method for selection of one or more communication paths based on request(s) received by the controller 24, FIGS. 8 and 9 illustrate flow charts of exemplary processes according to the present invention. In the exemplary process of FIG. 8, the blocking detection capability of the present invention has been added into a known method for selecting communication paths. In the exemplary process of FIG. 9, the ability to accommodate one or more protected paths according to the present invention has been added to a known communication path selection method. All steps of both FIG. 8 and FIG. 9 are performed by the controller 24 of the communication system of the present invention in conjunction with the use of the RAM 28 for storage of temporary values.

The process of FIG. 8 begins at step 101, which may be, for example, power-up of the communication system 12 components, and includes initialization of all elements of the ICM, the OCM and the PM. If step 101 is power-up, then no communication requests are currently being handled by communication system 12, and thus, all elements of the ICM, the OCM, and the PM are zero (0).

In step 102, the controller 24 determines whether a connection request has been received by the controller 24. If no connection request has been received, the controller 24 determines whether a disconnect request has been received in step 103. If no disconnect request is received by the controller 24 in step 103, the controller 24 returns to step 102 looking for a connection request. In this manner, the controller 24 loops until either a connection request or a disconnection request is received by the controller 24.

If in step 102 the controller 24 receives a point-to-point connection request to connect the $i^{th}$ input switch module to the $j^{th}$ output switch module, in step 104 the value of the element $c_{ij}$ of the PM is compared to m, the number of center stage modules. If $c_{ij}$=m, then the controller 24 provides an indication in step 105 that no paths are available between the $i^{th}$ input switch module and the $j^{th}$ output switch module, and therefore, the connection request cannot be satisfied at this time.

If the controller 24 receives a broadcast connection request in step 102 to connect the $i^{th}$ input switch module to more than one of the output switch modules, in step 104 the values of the elements $c_{ik}$, where k is representative of each of the requested output switch modules, are compared to m. If any $c_{ik}$=m, then the controller 24 provides an indication in step 105 that the broadcast request cannot be satisfied at this time.

If the communication request cannot be satisfied such that the controller 24 proceeds to step 105, the controller 24 then goes to step 102. In essence, the controller 24 is awaiting another communication request, either a connection request or a disconnection request after finding that a communication request cannot be satisfied.

If, on the other hand, the controller 24 determines at step 104 that at least one path is available to satisfy the communication request, the controller 24 proceeds to step 106 to establish at least one connection (one path for a point-to-point connection request, and a plurality of paths for a broadcast request). Step 106 requires that the controller 24 include a path selection or routing algorithm together with the ability to activate the appropriate inputs and outputs of the switches of all three stages to satisfy the request.

Upon completion of step 106, the ICM and the OCM are updated in step 107. The updating in step 107 requires revising elements of both the ICM and the OCM whose status has changed. For example, if a point-to-point connection request between the $i^{th}$ input switch module and the $j^{th}$ output switch module is satisfied through the $k^{th}$ center stage switch, the ICM element $a_{ik}$ and the OCM element $b_{kj}$ must be set to one (1) in step 107.

After updating the ICM and the OCM in step 107, the PM is updated in step 108. In this embodiment, the PM is incrementally updated as described herein. However, although not as efficient, the PM may be updated by ORing the ICM and the OCM as described herein to achieve the same result. Once the PM is updated in step 108, the controller 24 returns to step 102 as illustrated.

Now, returning to step 103, if the controller 24 receives a disconnect request in step 103, the controller 24 first drops connection, i.e., deactivates the appropriate inputs and outputs of the appropriate switches, as requested in step 109. Thereafter, the ICM and the OCM are updated in step 107 by changing the status of appropriate links (those dropped) from busy (1) to idle (0). Then, the PM is incrementally updated in step 108 by decrementing the appropriate element or elements of the PM as described hereinabove.

It will be appreciated by those of skill in the art that the exemplary process of FIG. 8 assumes that the controller 24 has not integrated the path selection capability with the path availability capability. In other words, the path selection means is not cognizant of unavailable paths as determined by the path availability capability. However, most path selection algorithms do not attempt to utilize busy links. Nonetheless, efficiencies will be achieved if the path selection algorithm eliminates from consideration unavailable paths as determined by the path availability capability.

It will also be appreciated that the path availability capability may be further integrated with the path determination capability. For point-to-multi-point communications, for example, it is helpful to know that only x paths are available, to ascertain whether the requested communication is even possible, or further to know that assignments of connections for a particular path are limited in number to avoid retrying to use an unavailable path. However, because a completely integrated approach may involve redesign of existing control subsystems and requires more intelligent, not yet available path selection algorithms, the exemplary process is illustrated in FIG. 8 in which the path availability means avoid unnecessary calculations when blocking or near blocking states occur is a viable alternative to complete integration.

The method illustrated in FIG. 8 does not accommodate protected paths. FIG. 9, on the other hand, illustrates a flow chart of a method according to the present invention in which one or more protected paths are reserved. The method of FIG. 9 is comprised of all of the steps of FIG. 8, plus one other step—step 110. Step 110 is disposed between step 104 in which the availability of at least one path to satisfy the connection request is determined, and step 106 in which connection is established to satisfy the connection request.

In step 110, the controller 24 determines whether the pending connection request will violate the reservation of the at least protected path of the system. Specifically, if L protected paths are to be preserved between input switch module u and output switch module v, in step 110, the controller compares the element $c_{u,v}$ of the PM to the quantity m–L, which represents the largest number of available paths that can be used to satisfy communication requests processed by the system without reserving a sufficient number of protected paths.

If $c_{u,v}$ is greater than m–L, the controller 24 advances to step 105 to indicate that the communication request cannot be satisfied. Otherwise, the controller 24 establishes connection in step 106 and updates the ICM, the OCM, and the PM in steps 107 and 108 as previously described in association with FIG. 8. In this case, the incremental change in $c_{u,v}$ would have to be ascertained based on the possible selection of an available center stage switch.

It will be appreciated by those of skill in the art that the exemplary processes of FIGS. 8 and 9 are efficient as blocking or near blocking states or attempts to use one or more protected lines or paths are determined prior to the execution of the path selection algorithm. Thus, fewer calculations are required with the present invention than in prior art systems. For example, there may be no paths available. If so, there is no need to execute the complex path selection algorithm. The exemplary processes of FIGS. 8 and 9 may be easily retrofitted into an existing communication system.

It will also be appreciated that the path availability determination may be further integrated with the path selection means. In addition to preventing execution of the path selection in the event that no paths are available for the requested communication, the path selection means could eliminate all blocked and/or protected lines from consideration in choosing a path or paths to satisfy the communication request.

It will be further appreciated that the communication system and path selection method of the present invention may be used to handle point-to-point and/or broadcast requests. Also, the path availability means is independent of the algorithm selected for routing such requests. The invention does not require that the spanning from a single point to multiple points for broadcast communications occur at any particular stage of the CLOS switching network.

It will be still further appreciated that the present invention is able to accommodate protected paths, and to do so in an efficient, simple manner. It will be yet further appreciated that the ability to obtain a snapshot of the network capacity, usage, congestion, and blocking and/or near blocking network states may be useful for a variety of network analysis purposes. The network's performance may be monitored, as by the presentation of the interface terminal of graphical information as illustrated in FIGS. 3–7, for example. Such real time analysis may also prove valuable for debugging an existing or newly developed system, looking for blocking, near blocking, or other anomalies, inefficiencies, or perhaps even shortcomings of the path selection algorithm. The path availability means may also be useful in a simulator to characterize the usage of the links as an indicator of switching capacity of the network.

It will be yet further appreciated that the apparatus and method of the present invention may be used in a time-division switch as well as the space-division switch illustrated in the embodiment of FIGS. 2 through 6. In a time-division switch, multiple input and output signals to and from, respectively, the switch are separated and switched by a time-slot interchange so that more than one signal may be transmitted over a particular input or output. It will be appreciated that regardless of whether multiple signals are separated and switched, or whether a single signal is switched, the status of the first and second links may still be monitored and path availability determined according to the present invention.

It will also be appreciated that the present invention is not dependent on use of a unidirectional switch. It is recognized that many switches are duplex, handling communication in both directions. The apparatus and method of the present invention are operable with duplex paths as well as the illustrated unidirectional path.

It will be further appreciated that the present invention may be utilized with any CLOS switching network. There is no dependence on whether the CLOS network satisfies Clos's theorem. Further, the CLOS network may be asymmetrical, i.e., a CLOS network in which the number of inputs for each input stage switches is not equal to the number of outputs for each output stage switches, or where the number of input stage switches does not equal the number of output stage switches. In the latter case, the PM becomes an $r_1$ by $r_2$ matrix, where $r_1$ is the number of input stage switches, and $r_2$ is the number of output stage switches.

As used herein and in the claims, for a particular input stage switch and output stage switch combination, a path is a combination of one of the first links and one of the second links connecting the input and output stage switches. A path is available if both the first and second links through the same center stage switch comprising the path are idle. If either the first or second links of the path are busy, the path is unavailable.

It will be appreciated that the above embodiments are merely illustrative and that those of ordinary skill in the art may readily envision or develop other embodiments that incorporate the principles of the present invention and fall within the scope and spirit thereof.

I claim:

1. A communication system, comprising:

a CLOS switching network having input, center and output stages, each stage including at least one switch, the network further comprising a plurality of first links connecting each of the at least one input stage switches to each of the at least one center stage switches and a plurality of second links connecting each of the at least one center stage switches to each of the at least one output stage switches;

means for determining a status for each of the first and second links, the status indicative of the idle or busy status of the respective link;

means for calculating a quantity of available paths between each of the at least one input stage switches to each of the at least one output stage switches from the status of the first and second links, each path defined as the combination of a first link with a second link to connect a selected input stage switch to a selected output stage switch through a common center stage switch, and an available path defined as a path in which the status of both the first and second links of the path is idle.

2. The system of claim 1, wherein the status determining means comprises a controller operably connected to each of the switches of the input, center and output stages of the CLOS switching network.

3. The system of claim 1, wherein the status determining means and the calculating means comprise a controller operably connected to the CLOS switching network.

4. The system of claim 1, further comprising:

a means for receiving a communication request indicating the selected input stage switch and the selected output stage switch; and a means for selecting a path of communication from a received communication request, said selected path of communication comprising a first available path, the path selecting means operably connected to the request receiving means and the calculating means, said path of communication selection based in part on the quantity of available paths as calculated by the calculating means.

5. The system of claim 1, wherein the switches of the CLOS switching network comprise space-division switches.

6. The system of claim 1, wherein the input stage switches of the CLOS switching network comprise time-division switches.

7. The system of claim 1, further comprising:

means for displaying the quantity of available paths to an observer, the display means operably connected to the calculating means.

8. The system of claim 1, wherein the at least one input stage switches are equal in number to the at least one output stage switches.

9. The system of claim 1, wherein the at least one input stage switches are unequal in number to the at least one output stage switches.

10. The system of claim 1, wherein each of the at least one input stage switches comprises an equal number of input ports, and each of the at least one output stage switches comprises an equal number of output ports.

11. The system of claim 10, wherein the number of input ports for each of the at least one input stage switches is equal to the number of output ports for each of the at least one output stage switches.

12. The system of claim 10, wherein the number of input ports for each of the at least one input stage switches is not equal to the number of output ports for each of the at least one output stage switches.

13. The system of claim 1, having $r_1$ input stage switches, $r_2$ output stage switches and m center stage switches, each $r_1{}^{th}$ input stage switch having m outputs, each $r_2{}^{th}$ output stage switch having m inputs, and each $m^{th}$ center stage switch having $r_1$ inputs and $r_2$ outputs, each first link comprising a connection $a_{ki}$ where k ranges from 1 to m, and i ranges from 1 to $r_1$, and each second link comprising a connection $b_{kj}$ where k ranges from 1 to m and j ranges from 1 to $r_2$, the path availability calculated in the form of a matrix where $c_{ij}$, each element of the path availability matrix, is $$c_{ij} = \Sigma_{k=1}{}^{m} (a_{ki} \text{ OR } b_{kj})$$

such that if an element $c_{ij}$ is less than m, at least one path is available between the $i^{th}$ input stage switch and the $j^{th}$ output stage switch.

14. The system of claim 13, wherein $r_1 = r_2$.

15. The system of claim 13, wherein each of the input stage switches has $n_1$ input ports and each of the output stage switches has $n_2$ output ports.

16. The system of claim 15, wherein $n_1 = n_2$.

17. The system of claim 1, having $r_1$ input stage switches, $r_2$ output stage switches and m center stage switches, each $r_1{}^{th}$ input stage switch having m outputs, each $r_2{}^{th}$ output stage switch having m inputs, and each $m^{th}$ center stage switch having $r_1$ inputs and $r_2$ outputs, each first link comprising a connection $a_{ki}$ where k ranges from 1 to m and i ranges from 1 to $r_1$, and each second link comprising a connection $b_{kj}$ where k ranges from 1 to m and j ranges from 1 to $r_2$, the path availability calculated in the form of a matrix where $c_{ij}$, each element of the matrix, is determined by incrementing or decrementing the value of $c_{ij}$ based on whether the connections $a_{ki}$ or $b_{kj}$ become busy or idle, respectively, from the idle or busy states, and such that if an element $c_{ij}$ is less than m, at least one path is available between the $i^{th}$ input stage switch and the $j^{th}$ output stage switch.

18. A communication system, comprising:

a CLOS switching network having input, center and output stages, each stage including at least one switch, the network further comprising a plurality of first links connecting each of the at least one input stage switches to each of the at least one center stage switches and a plurality of second links connecting each of the at least one center stage switches to each of the at least one output stage switches;

a memory device for storing a status for each of the first and second links, the status indicative of the idle or busy status of the respective link; and a controller operably connected to the CLOS switching network and the memory device, the controller operable to ascertain the status of the first and second links and to store the status of the first and second links in the memory device, the controller also operable to determine a quantity of available paths from the status stored in the memory device, each path defined as the combination of a first link and a second link connected to a selected input stage switch to a selected output stage switch through a common center stage switch, and an available path defined as a path in which the status of both the first and second links of the path is idle.

19. The system of claim 18, further comprising:

a means for receiving a selected input stage switch and a selected output stage switch; and wherein the controller is further operable to select a path of communication for the selected input stage switch and the selected output stage switch based in part on the determined quantity of available paths.

20. A method for transmitting at least one signal through communication system, the system comprising a CLOS switching network including input, center and output stages with each stage having at least one switch, the network further comprising a plurality of first links connecting each of the at least one input stage switches to each of the at least one center stage switches and a plurality of second links connecting each of the at least one center stage switches to each of the at least one output stage switches, the system also comprising a means for determining a status for each of the first and second links, the status indicative of the idle or busy status of the link, and the system also comprising a means for calculating a quantity available paths between each input stage switches to each of the at least one output stage switches from the status of the first and second links, a path defined as the combination of a first link with a second link to connect a selected input stage switch to a selected output stage switch through a common center stage switch, an available path defined as a path in which the status of both first and second links is idle, the method comprising the steps of:

(a) determining the status of each of the first and second links; and (b) determining a quantity of available paths between at least one input stage switch to at least one output stage switch.

21. The method of claim 20, wherein the system further comprises a means for receiving a communication request, the request indicating the selected input stage switch and the selected output stage switch through which a signal is to be transmitted, the method further comprising, prior to step (a), the step of receiving a communicative request, and the method further comprising the steps of:

(c) indicating blocking or busy for a communication request for an input stage switch and output stage switch for which no path was determined to be available.

22. The method of claim 20, wherein the system further comprises at least one protected path, each protected path defined as the combination of one of the first links and one of the second links through a common center stage switch, the method further comprising the step of:

(c) adjusting the determined quantity of available paths for paths constituting the first and second links of the at least one protected path.

23. The method of claim 20, wherein the system further comprises means for receiving a communication request indicating the selected input stage switch and the selected output stage switch through which a signal is to be transmitted, and means for selecting a path to satisfy the communication request, the method further comprising, prior to step (a), the step of receiving a communication request, and the method further comprising the steps of:

(c) informing the selecting means of the determined quantity of available paths; and (d) selecting an available path, if any, to satisfy the request.

24. The method of claim 23, wherein each switch of the input, center and output stages comprises at least one input and at least one output, the connection of an output from an input stage switch to a center stage switch comprising one of the first links, and the connection of an output from a center stage switch to an output stage switch comprising one of the second links, and wherein the system further comprises means for activating each of the inputs and outputs of each switch in each of the input, center and output stages, the method further comprising the step of:

(e) activating appropriate inputs and outputs switches of the input, center and output stages to permit the signal designated by the communication request to pass through the selected available path.

25. The method of claim 20, wherein the system further comprises means for receiving a communication request indicating the selected input stage switch and the selected output stage switch through which a signal is to be transmitted, and means for selecting path to satisfy the communication request, the method further comprising, prior to step (a), the step of receiving a communication request, and the method further comprising the step of:

(c) determining whether any path is available between any of the at least one input stage switches to any of the at least one output stage switches;

(d) if no path is available, returning to step (b);

(e) if a path is available, selecting a path to satisfy the communication request.

26. The method of claim 20, wherein the system further comprises means for receiving a communication request indicating the selected input stage switch and the selected output stage switch through which a signal is to be transmitted, a means for selecting a path to satisfy the communication request, the method further comprising, prior to step (a) the step of receiving a communication request, and the method further comprising the step of:

(c) determining if any path between the selected input stage switch and the selected output stage switch indicated by the communication request is available;

(d) if no path between the selected input stages switch and the selected output stage switch is available, returning to step (b);

(e) if only one path is available between the selected input stage switch and the selected output stage switch, selecting the one available path; and (f) if more than one path is available between the selected input stage switch and the selected output stage switch, selecting a path with the path selection means of the system.

* * * * *